United States Patent [19]

Izawa et al.

[11] Patent Number: 5,665,179

[45] Date of Patent: Sep. 9, 1997

[54] PROCESS FOR PRODUCING A COIL SPRING

[75] Inventors: Yoshinobu Izawa; Satoru Kondo, both of Nagoya; Hiroshi Yarita, Matsudo, all of Japan

[73] Assignees: Togo Seisakusho Corp., Aichi-ken; Suzuki Metal Ind. Co., Ltd., Tokyo, both of Japan

[21] Appl. No.: 507,926

[22] Filed: Jul. 27, 1995

[30] Foreign Application Priority Data

Jul. 28, 1994 [JP] Japan ................. 6-177121

[51] Int. Cl.$^6$ ............... C21D 9/02; C21D 1/06; C23C 8/26; C22C 38/02
[52] U.S. Cl. ............... 148/226; 148/230; 148/580; 148/908
[58] Field of Search ............... 148/908, 580, 148/226, 230

[56] References Cited

U.S. PATENT DOCUMENTS 3,073,022  1/1963  Bush et al. .

FOREIGN PATENT DOCUMENTS

| 4-247824 | 9/1992 | Japan . |
| 5-179348 | 7/1993 | Japan . |
| 5-339763 | 12/1993 | Japan . |
| 2 210 299 | 6/1989 | United Kingdom . |

OTHER PUBLICATIONS

English–language abstract of Japanese Patent No. JP-A-02-107746, from Patent Abstracts of Japan, vol. 14, No. 314 (Jul. 1990).

English–language abstract of Japanese Patent No. JP-A-05-177544, from Patent Abstracts of Japan, vol. 17, No. 595 (Oct. 1993).

English–language abstract of Japanese Patent No. JP-A-05-148537, from Patent Abstracts of Japan, vol. 17, No. 540 (Sep. 1993).

English–language abstract of Japanese Patent No. JP-A-04-285142, from Patent Abstracts of Japan, vol. 17, No. 93 (Feb. 1993).

English–language abstract of Japanese Patent No. JP-A-63-176430, from Patent Abstracts of Japan, vol. 12, No. 450 (Nov. 1988).

*Primary Examiner*—Deborah Yee
*Attorney, Agent, or Firm*—Oliff & Berridge

[57] ABSTRACT

A process for producing a coil spring comprises steps of: cold drawing a wire comprising: C in an amount of 0.55 to 0.75% by weight; Si in an amount of 1.00 to 2.50% by weight; at least two primary metals selected from the primary metal group consisting of: Mn in an amount of 0.30 to 1.5% by weight; Ni in an amount of 1.00 to 4.00% by weight; Cr in an amount of 0.50 to 2.50% by weight; Mo in an amount of 0.10 to 1.00% by weight; at least one secondary metal selected from the secondary metal group consisting of: V in an amount of 0.05 to 0.60% by weight; Nb in an amount of 0.05 to 0.60% by weight; and the balance of substantially Fe; oil quenching and tempering the wire; hot tempering the wire, thereby preparing the tempered wire whose tensile strength σb falls in the range of from 1370 to 1670 N/mm$^2$; cold coiling; hardening and tempering; grinding; gas nitriding; high strength two-stage shot peening; and low temperature annealing the tempered wire. Accordingly the present process can product the coil spring whose endurance limit τm is 687±560 MPa and which has high strength and high fatigue resistance without breakage.

3 Claims, 7 Drawing Sheets

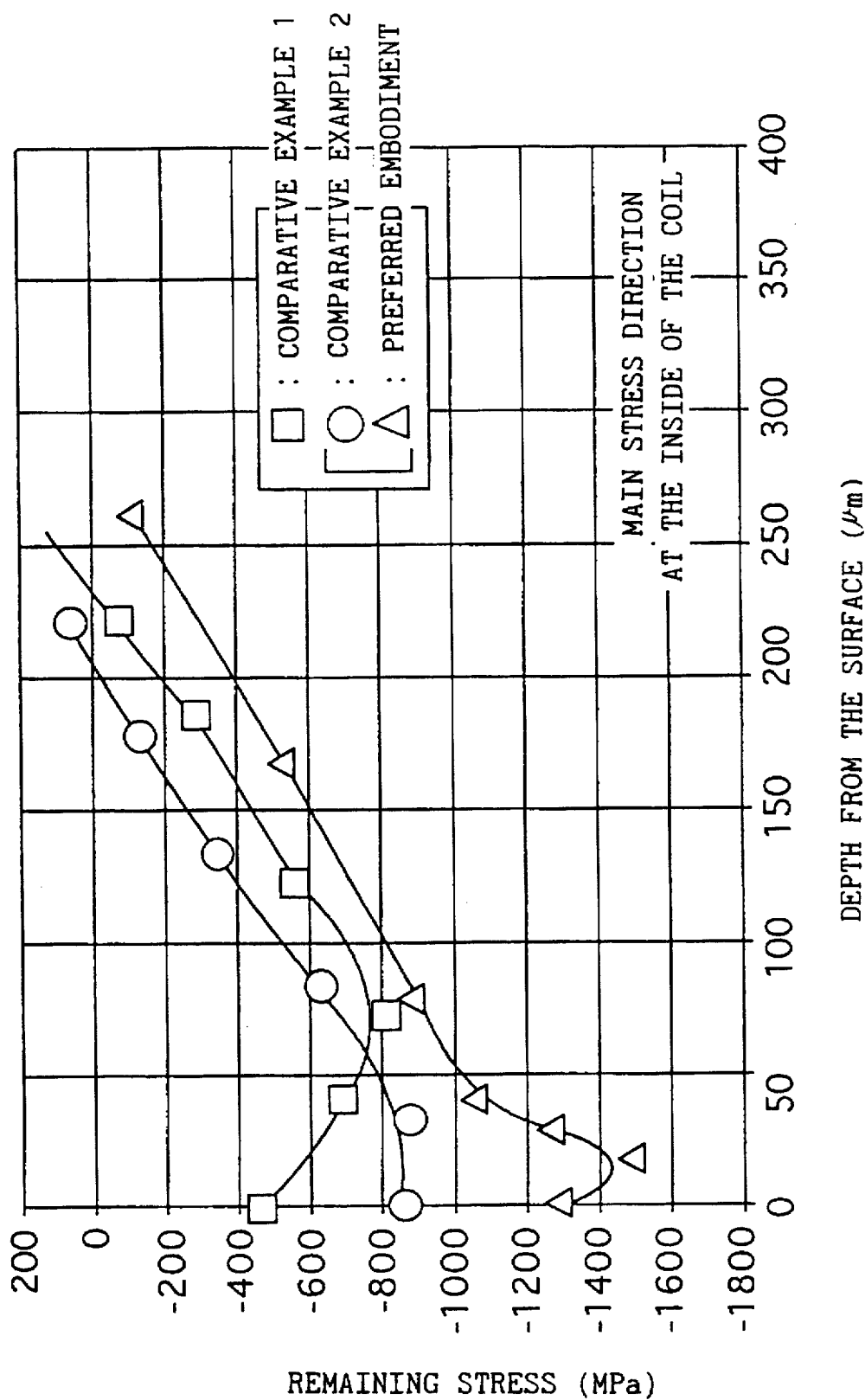

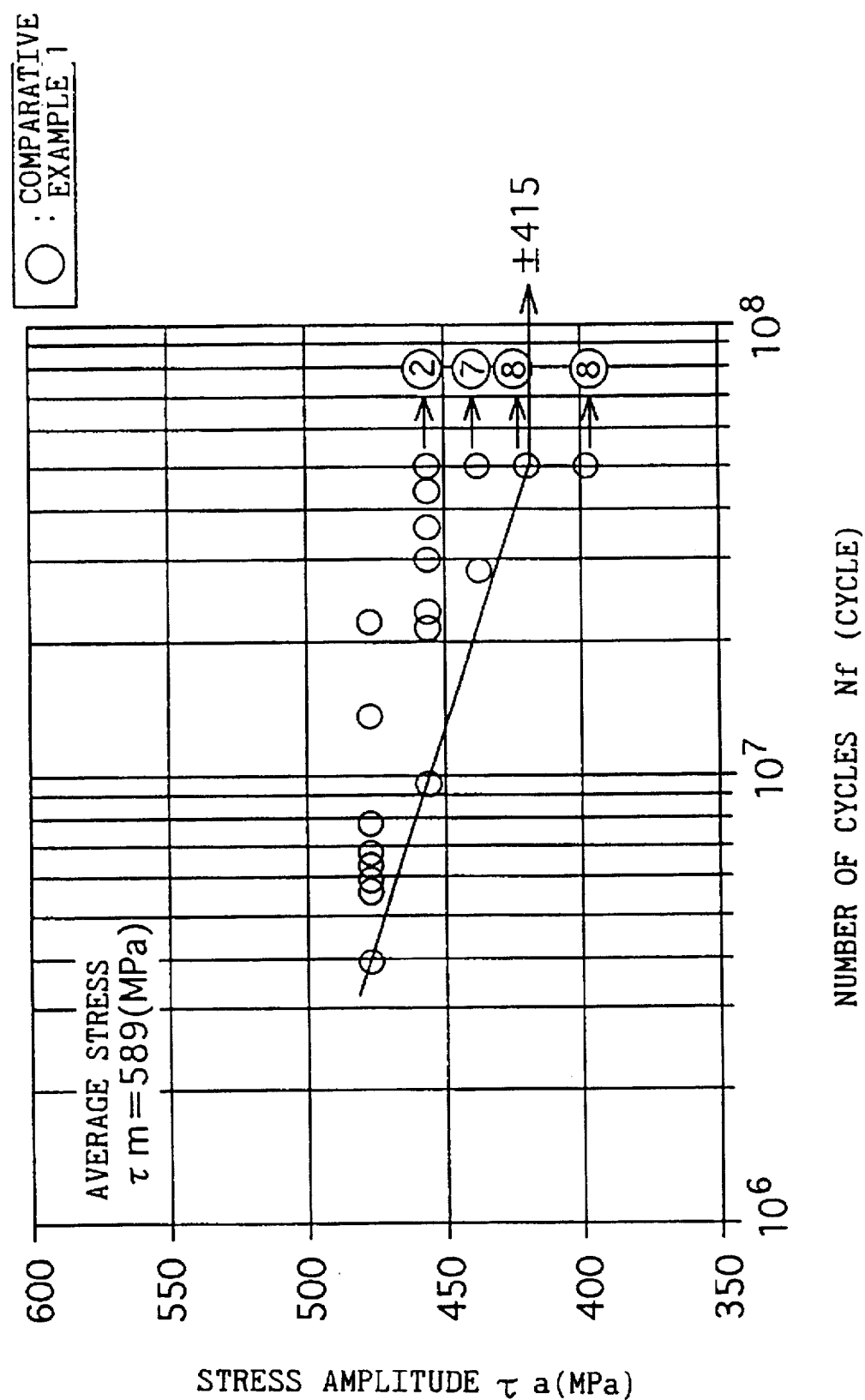

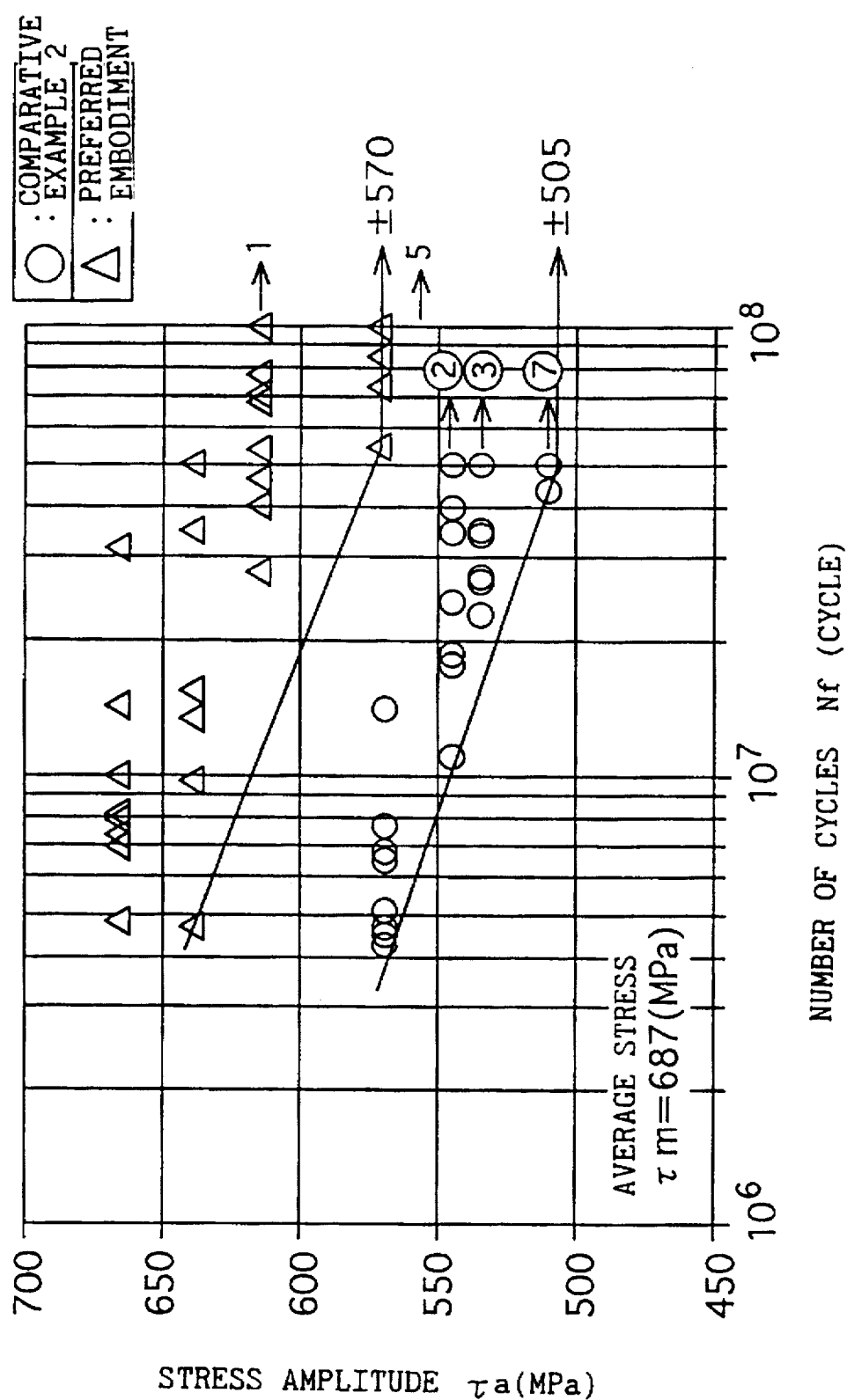

PROCESS FOR PRODUCING A COIL SPRING

BACKGROUND OF THE INVENTION

1. Field of the Invention

The present invention relates to a process for producing a coil spring which has high strength and high fatigue resistance and which is used for a torsion spring of a clutch disc which may be a valve spring of an internal combustion engine for an automobile, a suspension spring for an automobile or a driving system part.

2. Description of the Related Art

It has been demanded for a coil spring, which may be a valve spring for an engine, a suspension spring for an automobile or a driving system part, to have high strength and high fatigue resistance so as to obtain high output of an engine for an automobile and to lighten a car body.

As the conventional method for producing a spring having high strength, the following method has been known. In the conventional method, after wire drawing a steel wire for spring, oil tempered wires for spring which hardening and tempering were conducted and which has high tensile strength were subjected to the coil molding; heat treatment; grinding; and remaining stress assigning by shot peening; and then polishing treatment was conducted so as to reduce the maximum roughness on the surface thereof.

For example, Japanese Unexamined Patent Publication (KOKAI) No. 4-247824 discloses a process for producing a spring having high strength as follows. In this process of the publication, the oil tempered wires for spring made of hardened and tempered steel which has high strength and whose tensile strength is not less than 1960N/mm$^2$ are subjected to warm coiling at the temperature ranging from 100° to 550° C. To install this warm coiling machine used in this conventional process costs very much. Furthermore, even by using this warm coiling, it is difficult to mold a spring having D/d≦4 in some cases.

Also, Japanese Unexamined Patent Publication (KOKAI) No. 5-179348 discloses a process for producing a coil spring having the same high strength and high fatigue resistance as those in the case of cold coiling as follows. In this process of the publication, coil forming is conducted by hot coiling the wire for cold coiling at the temperature ranging from 900° to 1050° C. and then, it is treated in tempering. It costs very much to install hot coiling machine which is necessary for this conventional process.

Furthermore, Japanese Unexamined Patent Publication No. 5-339763 discloses the following process as follows. In this conventional process, oil tempered wires for spring having oxide skin are subjected to coiling molding; heat treatment; descaling treatment so as to obtain the surface maximum roughness being not more than Rmax 5 μm; nitriding treatment; and remaining stress assigning treatment by shot peening. Therefore, in this process, a surface polishing process is not necessary after the remaining stress assigning process.

SUMMARY OF THE INVENTION

In the conventional processes for producing a coil spring, by using this oil tempered wires for spring, coil molding, heat treatment, grinding, nitriding and shot peening are successively conducted. The oil tempered wires for spring has the high tensile strength ranging from 1960 to 2160 (N/mm$^2$) so that there arises some problems that the cold coiling is hard to be conducted and breakages may occur in many cases in the time of coiling.

The present invention has been developed in view of the above-mentioned problems. It is an object of the present invention to provide a process for producing a coil spring which has less breakages even in cold coiling, improved fatigue resistance and high strength.

The inventors of the present invention carried out a research and development extensively on the method for improving the fatigue resistance and strength. As a result, they discovered that the cold coiling molding can be conducted more easily by using the annealed wire which is produced by hot tempering the oil tempered wire for spring. Also they discovered that the spring having the high strength and high fatigue resistance can be produced by conducting the hardening and tempering, grinding, gas nitriding, two-stage shot peening and low temperature annealing successively. They discovered that the spring having the high strength and high fatigue resistance can be produced when the above-mentioned processes are conducted successively especially by using the alloy of the specific composition. The inventors thus completed the present invention.

Namely the present process for producing a coil spring comprises the steps of:

cold drawing a wire comprising:
  C in an amount of 0.55 to 0.75% by weight;
  Si in an amount of 1.00 to 2.50% by weight;
  at least two primary metals selected from the primary metal group consisting of:
    Mn in an amount of 0.03 to 1.5% by weight;
    Ni in an amount of 1.00 to 4.00% by weight;
    Cr in an amount of 0.50 to 2.50% by weight;
    Mo in an amount of 0.10 to 1.00% by weight;
  at least one secondary metal selected from the secondary metal group consisting of:
    V in an amount of 0.05 to 0.60% by weight;
    Nb in an amount of 0.05 to 0.60% by weight; and
  the balance of substantially Fe;

oil hardening and tempering said wire;

hot tempering said wire, thereby preparing the tempered wire whose tensile strength σb falls in the range of from 1370 to 1670 N/mm$^2$;

cold coiling; hardening and tempering; grinding; gas nitriding; high strength two-stage shot peening; and low temperature tempered said annealed wire.

The wire for spring used in the present invention comprises: C; Si; at least two primary metals selected from the primary metal group consisting of: Mn, Ni, Cr and Mo; at least one secondary metal selected from the secondary metal group consisting of: V and Nb; and the balance of substantially Fe.

Carbon (C) affects the strength (hardness) of the hardened and tempered steel wire. If the carbon is less than 0.55%, the steel wire can't obtain the enough strength. If carbon is added more than 0.75%, there is no more advantage in strength. So the upper limit of carbon which is added to the wire was set to be 0.75%. Silicon (Si) is dissolved in ferrite matrix and it is necessary to improve the strength and secure the fatigue resistance. Accordingly silicon (Si) is necessary not less than 1.00%. However, if silicon is more than 2.5%, there arises some problems that the toughness is reduced and at the same time, remarkable decarbonization at the time of production occurs.

Manganese (Mn) comprising the primary metal group improves the hardening and it secures the strength and the toughness after the heat treatment. Also, Nickel (Ni), chromium (Cr) and molybdenum (Mo) comprising the primary metal group improve the hardening, improve the tempering and softening resistance or deposit the fine carbide so that they improve the strength and toughness of the spring. Among these metal included in the primary metal group, it is necessary to compound and blend at least two kinds of primary metals.

Mn is necessary not less than 0.30%. However, if Mn is added more than 1.50%, the toughness is deteriorated so that this must be avoided. It is necessary to add Ni in an amount of 1.00 to 4.00%. If Ni is less than 1.00%, the good effect thereof can't be obtained and if Ni is added more than 4.00%, there is no more effect. It is necessary to add Cr not less than 0.50%. If Cr is added more than 2.50%, permanent set in fatigue is deteriorated so that this must be avoided. Mo improves the tempering and softening resistance and deposits fine carbide so that it has the effect to improve the strength and toughness of the spring. Accordingly, Cr is added in an amount ranging from 0.10 to 1.00%. If Cr is added less than 0.01% the effect of Cr is not recognized and if Cr is added more than 1.00%, the effect thereof is saturated so that this is not preferable.

Vanadium (V) and Niobium (Nb) comprising the secondary metal group are added to improve the strength and permanent set in fatigue by refining and precipitation hardening of crystal grain. One or two kinds of V and Nb is compounded and blended in an amount of 0.05 to 0.60%. If the compounding amount of each component is less than 0.05%, there is no effect and if the compounding amount is more than 0.60%, the effect is saturated.

The iron and steel wire of the present invention can be produced to obtain the cold wire material for producing coil spring by being subjected to the flaw working, hot rolling, peeling, annealing and cold wire drawing successively.

The hard drawn wire obtained in the conventional cold wire drawing has the tensile strength σb falls in the range of from 1080 to 1320N/mm². On the surface of this hard drawing wire whose φ is 3.2 mm and whose percentage reduction of area is about 38%, there exist residue of powder for wire drawing and phosphate coating. When this drawn wire is subjected to coiling working, the lubrication on the surface of the drawn wire is inferior so that flaw is generated on the outer surface of the coil and furthermore, the tensile strength is reduced so that deformation caused by the crushing of the wire is generated. Accordingly, it is not preferable to use this hard drawing wire as it is. It is necessary to conduct the heat treatment of hardening and tempering after this wire is subjected to the coiling working.

Also the wire which is produced by oil tempering treatment of the cold drawn wire has the tensile strength σb ranging from 1960 to 2160N/mm². And the drawn wire whose φ is 3.2 mm has the percentage reduction of area being about 40%. On the surface of this oil tempered wires for spring, there exists the oxided scale. Accordingly, the lubrication of the surface thereof is improved and there is no flaw and crushing of the wire generated at the time coiling. However, breakage is easy to be generated. Accordingly, when D/d is 5, the wire whose φ is 3.2 mm has rather high percentage of breakage being about 5%. Furthermore, the hardness is not less than Hv580, so the heat treatment is conducted low temperature.

In the process of the present invention, cold drawn wire is subjected to the oil hardening and tempering treatment and furthermore, annealing so as to obtain the annealed wire. This annealed wire whose tensile strength σb ranging from 1370 to 1670N/mm² and whose φ is 3.2. mm has its percentage reduction of area being about 50%. On the surface of this wire, there exists oxided scale and this wire has improved coiling performance compared with that of the oil hardened and tempered wire.

This tempered wire is subjected to the cold coiling molding and then, hardening and tempering treatment so as to gain high strength and at the same time remaining stress and remaining deformation, which are generated on the spring, are removed and after that, this wire is subjected to griding of the bearing surface.

In the next process, the coil spring is subjected to the nitriding. This nitriding is the same treatment as that of the conventional method. For example, the predetermined nitrided layer can be formed by treating in the atmosphere of ammonia at the temperature ranging from 420° to 550° C. for about 24 hours. The surface of the obtained nitrided layer is harder than that of the conventional SWOSC-V steel product. Also by nitriding, larger compressed remaining stress is easy to be formed not only on the surface thereof but also at the inside thereof owing to the next shot peening process. Accordingly the fatigue resistance is improved in the present invention. The deeper and stronger compressed remaining stress is formed in the alloyed steel in the present invention compared with that of the conventional SWOSC-V steel product.

It is preferable that the shot peening process is conducted in the high strength two stage which comprises the first shot peening process and the second shot peening process. By this shot peening process, the compressed remaining stress is given through the surface of the coil spring whose surface is hardened by nitriding and to the inner center thereof.

In the first stage shot peening process, usually the shot whose diameter falls in the range of from 0.6 to 1.0 mm and whose hardness Hv falls in the range of from 600 to 800 is used in the impeller projection having its velocity ranging from 70 100 m/s. Owing to this process, the compressed remaining stress can be formed into the deeper position of the inside. When the compressed remaining stress is formed into the deeper position of the inside, the compressed remaining stress is tend to be given insufficiently. It is an object of the second shot peening process to offer the above-mentioned compressed remaining stress neap the surface.

In the second shot peening process, the shot whose diameter falls in the range of from 0.15 to 0.3 mm and whose hardness Hv falls in the range of from 700 to 900 is used in the air projection whose pressure falls in the range of from 0.3 to 0.7 MPa. By this shot, the compressed remaining stress can be effectively formed.

After shot peening, the cold annealing is conducted so as to relieve the extraordinary stress and to stabilize the compressed remaining stress so that the coil spring which has improved fatigue resistance and high strength can be produced.

In the process for producing a coil spring of the present invention, cold drawn wire having the specific alloy composition is subjected to the oil quenching and tempering treatment; and then annealed wire tempered at the high temperature is subjected to the cold coiling; and it is subjected to hardening and tempering; and after it is subjected to the gas nitriding, it is subjected to the high strength two-stage shot peening and cold annealing.

In the present invention, the alloy composition of the wire is specified; as the wire which is subjected to the cold coiling, the annealed wire which is subjected to the oil quenching and tempering treatment and hot tempering is used; and furthermore the shot peening process comprises the high strength two-step shot peening treatment in which hardness, diameter and the condition of projection are varied to be in two stages. Therefore, in the present invention there arises little breakage, and the present invention can produce the wire whose hardness, remaining stress and fatigue resistant characteristics are improved compared with those of the conventional coil spring produced by the conventional process.

In the present process for producing a coil spring having high strength, oil quenched and tempered wire which is the annealed wire tempered at the high temperature. Therefore in the present invention, there arises little breakage at the cold coiling. Furthermore in the present invention, the material of alloy steel is specified; hardening and tempering is conducted after the cold coiling; then nitriding is conducted; and afterwards high strength two-stage shot peening is conducted. Accordingly, at the uppermost surface portion of the coil spring, a large amount of compressed remaining stress is given and also to the deeper portion of the inside, the compressed remaining stress is given. So by using the present process for producing a coil spring having high strength, the coil spring having improved fatigue resistance and durability can be produced.

BRIEF DESCRIPTION OF THE DRAWING

A more complete appreciation of the present invention and many of its advantages will be readily obtained as the same becomes better understood by reference to the following detailed description when considered in connection with the accompanying drawings and detailed specification, all of which forms a part of the disclosure:

FIG. 7 is a graph showing the distribution of remaining stress in the preferred embodiment and the comparative examples;

FIG. 8 is a graph showing the result of fatigue test in the comparative example 1; and FIG. 9 is a graph showing the results of fatigue test in the preferred embodiment and the comparative example 2.

DETAILED DESCRIPTION OF THE PREFERRED EMBODIMENT

Figure 1:
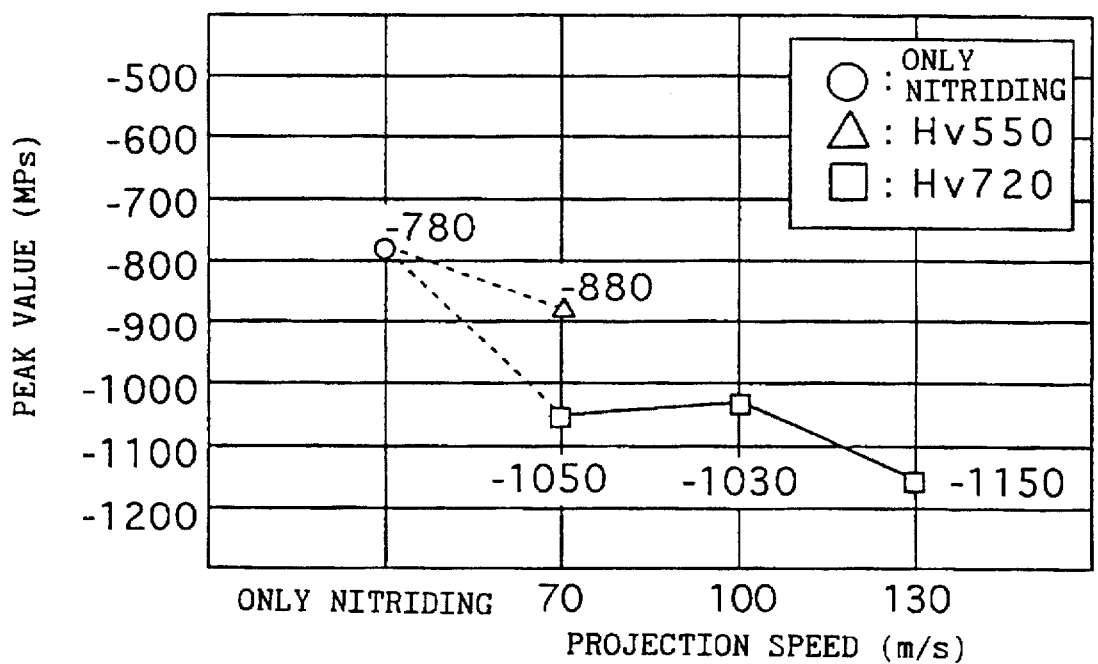
FIG. 1 is a graph showing the relationship between the projection speed and the peak value in the high strength two-stage shot peening.

Having generally described the present invention, a further understanding can be obtained by reference to the specific preferred embodiment which are provided herein for purposes of illustration only and are not intended to limit the scope of the appended claims.

Preferred Embodiment

The wire (SWACX-V) for spring used in the present preferred embodiment is the alloy steel comprising carbon in an amount of 0.64% by weight (Hereinafter, % means % by weight if it is not specified particularly.) silicon in an amount of 1.43%, manganese in an amount of 0.67%, phosphorous in an amount of 0.015%, sulfur in an amount of 0.006%, chromium in an amount of 1.57%, molybdenum in an amount of 0.57%, vanadium in an amount of 0.26% and the balance of iron. In the present preferred embodiment, after the above mentioned alloy steel was subjected to flaw working, hot rolling, peeling, and annealing, the alloy steel was subjected to cold drawing, oil quenching and tempering and hot tempering so as to get the annealed wire. This annealed wire has the tensile strength $\sigma B$ being $1,570 N/mm^2$ and the surface of the wire is covered by the oxided scale.

This annealed wire was subjected to cold coiling so as form the coil spring whose diameter is 3.2 mm; whose coil central diameter is 21.2 mm; whose total number of turns is 6.5 turns; whose effective number of turns is 4.5 turns; whose free length is 52 mm; and whose spring constant is $23.54 N/mm^2$. Afterward, the wire was hardened at the temperature of 880° C. for 30 minutes and it was tempered at the temperature of 435° C. for 60 minutes by heated gas. Next, the bearing surface was subjected to grinding. This coil whose bearing surface was ground was subjected to the gas nitriding treatment under the atmosphere of ammonia gas at the temperature of 435° C. for 24 hours. Therefore, the nitriding surface was formed on the surface of the coil.

After that, the wire was subjected the high strength two-stage shot peening. In the first stage shot peening, a shot ball of $\phi$ 0.8RCW and Hv720 was used and the shot peening of the impeller projection (for 30 minutes) was conducted under the condition of 70 m/s. Next, the second stage of shot peening was conducted. In the second stage shot peening, a shot ball of $\phi$ 0.25RCW and Hv800 was used and the shot peening was conducted under the condition of air projection pressure being 0.5 MPa (for 30 minutes).

Next, the wire was subjected to the cold or low temperature annealing at the temperature of 225° C. for 30 minutes, the inside distortion which is extraordinary large was removed and the compressed remaining stress was given on the coil surface so that the coil spring of the present preferred embodiment was obtained.

Comparative Example 1

In this comparative example 1, instead of alloy steel which was used in the preferred embodiment, SWOSC-V steel of JIS standard is used. The SWOSC-V, percent by weight, comprises carbon in an amount of 0.56%, silicon in an amount of 1.42%, manganese in an amount of 0.65%, phosphorous in an amount of 0.008%, sulfur in an amount of 0.009%, chromium in an amount of 0.67% and the balance of iron. The SWOSC-V steel was cold drawn and then, it was hardened and tempered so that the alloy steel oil hardened and tempered wire whose tensile strength $\sigma B$ is $1,950 N/mm^2$ was used. And after passing through the next process, the coil spring was produced.

First, this oil hardened and tempered wire was subjected to the cold annealing, at the temperature of 425° C. for 30 minutes, as a substitute for the hardening and tempering in the above-mentioned preferred embodiment. After that, the bearing surface was subjected to grinding. And then without nitriding treatment, the shot peening was conducted by using the shot ball of $\phi$ 0.8RCW and Hv550 under the condition of impeller projection at the speed of 70 m/s. Next the cold annealing was conducted at the temperature of 225° C. for 30 minutes.

Comparative Example 2

This comparative example 2 uses the same alloy steel as that of the preferred embodiment. In the comparative example 2, the alloy steel was subjected to the cold drawing; the hardening and tempering treatment; and the low temperature annealing so that wire whose tensile strengthen σB 1.570N/mm² and which is the same as that of the preferred embodiment was used.

The same treatment was conducted as that of the preferred embodiment except that the one-stage shot peening was used instead of the the high strength two-stage shot peening.

The shot peening was conducted by using the shot ball of ϕ 0.8RCW and Hv550 under the impeller projection at the speed of 70 m/s.

Evaluation of Shot Peening

In order to certify the effect of the high strength two-stage shot peening, the coil spring was produced by the same method of that of the preferred embodiment except changing the condition of shot peening. In thus obtained coil spring, the peak value and the crossing point of the remaining stress and the surface roughness of the coil spring were investigated. As the reference value, the value of the coil spring which is not subjected to the shot peening but which is only subjected to nitriding was used.

Figure 2:
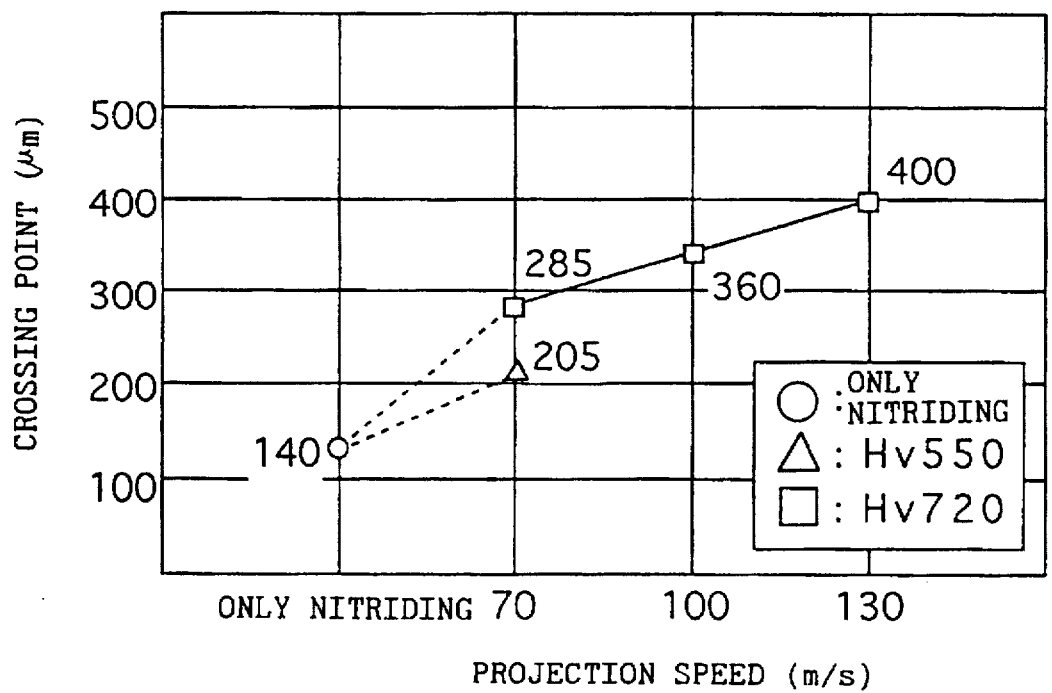
FIG. 2 is a graph showing the relationship between the projection speed and the crossing point in the high strength two-stage shot peening.
Figure 3:
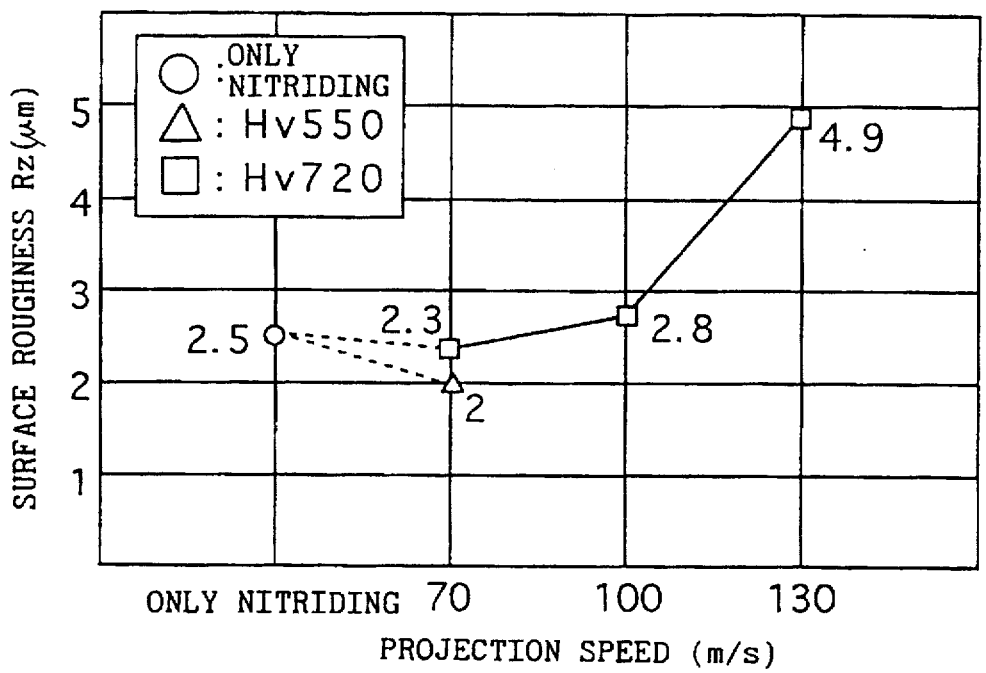
FIG. 3 is a graph showing the relationship between the projection speed and the surface roughness in the high strength two-stage shot peening.

In FIGS. 1 to 3, the projection conditions of the first stage in the high strength two-stage shot peening were changed. As the result, FIGS. 1 to 3 show the effect of the hardness of the shot ball and the projection speed based on the investigation of the peak value, crossing point and surface roughness.

In FIG. 1, when the projection speed is raised to be through 70 m/s, 100 m/s to 130 m/s, the peak values of the shot ball having the hardness of Hv=720 show almost constant to be −1050, −1030 and −1150 MPA. So the peak values are almost constant without reference to the projection speed and the peak values are improved compared with those in which only nitriding is conducted. However, if the hardness of the shot ball is Hv=500, the peak value is −880 MPa when the projection speed is 70 m/s and the peak value is −780 MPa when nitriding is only conducted. Accordingly there is little effect in this case.

FIG. 2 shows the relationship between the crossing point and the projection speed of the shot ball. If the hardness Hv of the shot ball is 550, the crossing point doesn't become deeper compared to that of 720 which is in the extent ranging from 650 to 850 in the present invention even if the projection speed is increased so that there is little effect in this case.

FIG. 3 shows the relationship between the surface roughness and the projection speed. If the projection speed of the shot ball is 130 m/s, the surface of the treated material becomes too rough. However until the projection speed is 120 m/s, the roughness Rz is almost constant.

Figure 4:
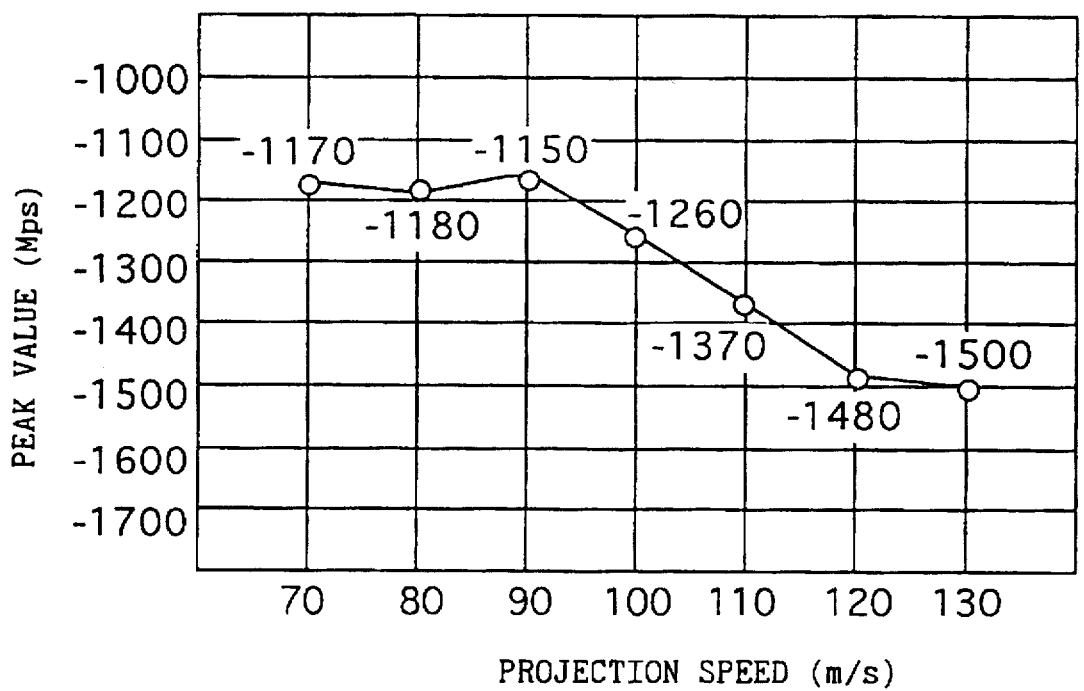
FIG. 4 is a graph showing the relationship between the impeller projection speed and the peak value in the high strength two-stage shot peening.
Figure 5:
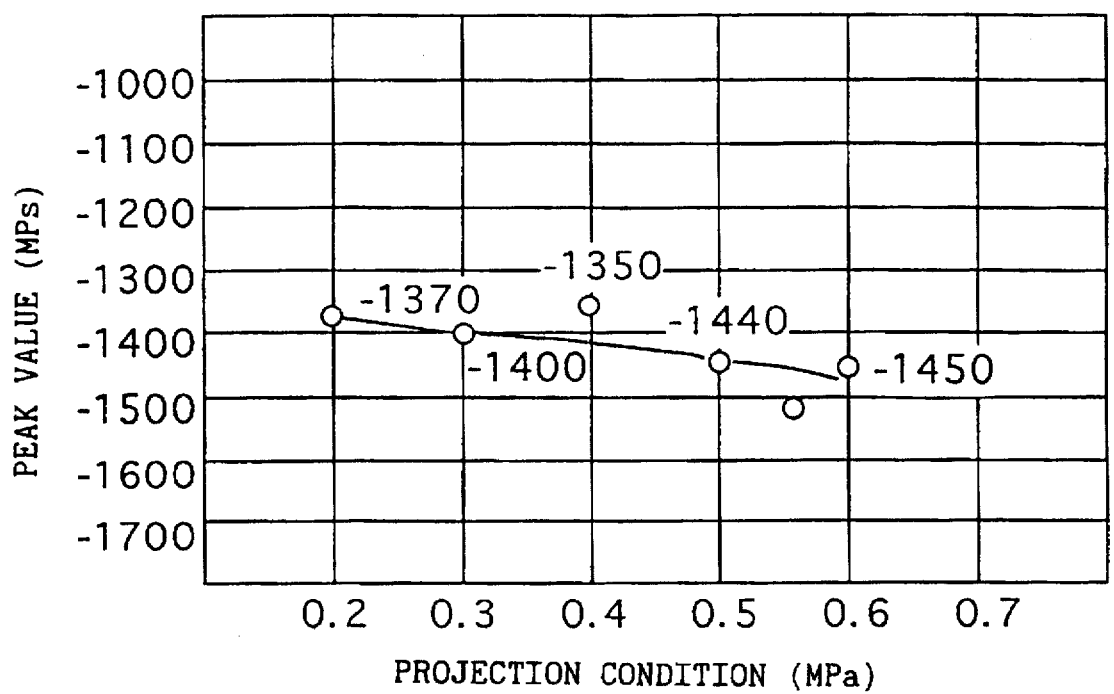
FIG. 5 is a graph showing the relationship between the air projection speed and the peak value in the high strength two-stage shot peening.

FIGS. 4 and 5 show: the relationship between the projection speed of the shot at the second stage and the remaining stress peak value; and the relationship between the projection condition of the shot at the second stage and the remaining stress peak value respectively. When the impeller projection is used, peak value is not increased if the speed is not less than 100 m/s. If the speed is not less than 100 m/s, it is hard to conduct the continuous operation with regard to the equipment. The air projection is effective because the change in the peak value is little in response to the change in pressure.

Hardness of the Coil Spring

Figure 6:
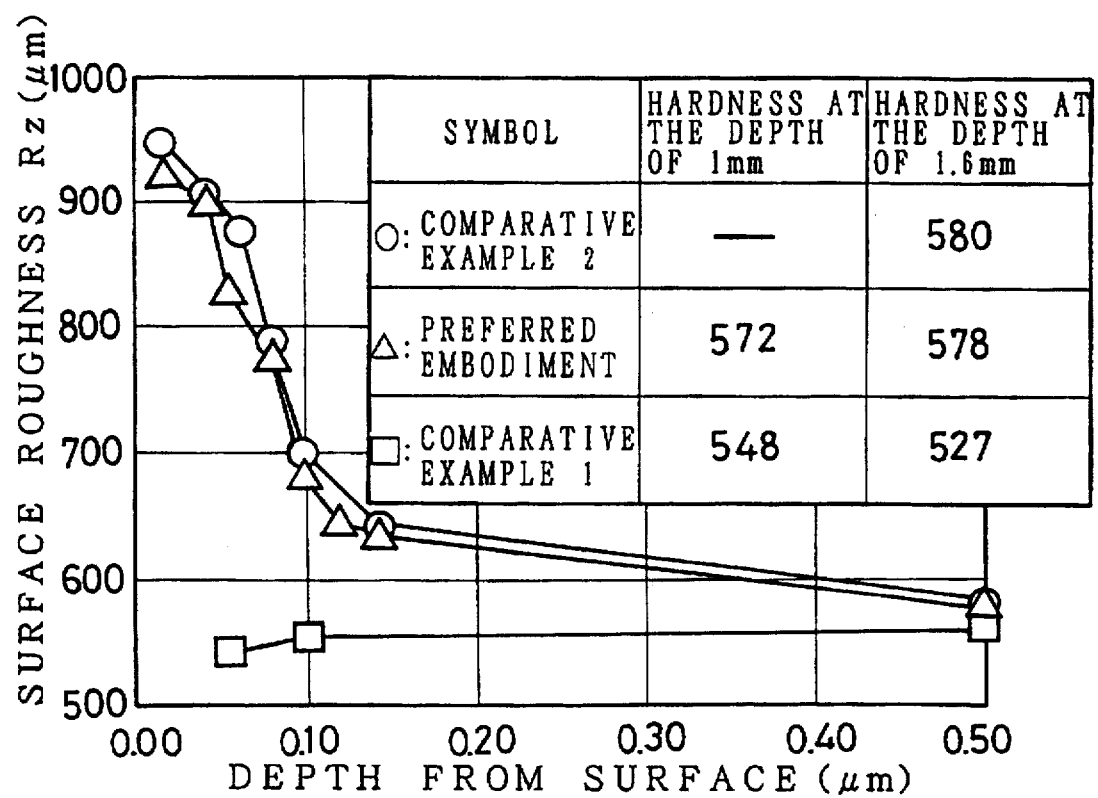
FIG. 6 is a graph showing the distribution of the spring hardness in the preferred embodiment and the comparative examples.

Three kinds of coil springs which were obtained in the above-mentioned preferred embodiment and the comparative examples 1 and 2 were measured with respect to the Vickers hardness of from each surface to each deep portion. Each of the coil spring was cut and each of the Vickers hardness was measured from the surface thereof into the deeper portion on the cross section. The result of the measurement is shown in FIG. 6. The relationships between Vickers hardness (Hv) and the depth from the surface of the coil spring in the present preferred embodiment is shown by using Δ and continuous line. Similarly, the relationships between Vickers hardness (Hv) and the depth form the surface of the coil spring in the comparative examples 1 and 2 are shown by using □, ○ and continuous line respectively. At the hardness of the depth being 1 mm, the preferred embodiment shows Hv572 and the comparative example 1 shows Hv548. At the hardness of the depth being 1.6 mm, the preferred embodiment shows Hv572, comparative example 1 shows Hv527 and the comparative example 2 shows Hv580.

Compared the non-nitrided spring of the comparative example 1 of the SWOSC-V steel, the comparative example 2 and the preferred embodiment of the SXACX-V steel show the improved hardness to the great extent near the surface thereof.

Distribution of the Remaining Stress of the Coil Spring

Three kinds of coil springs which were obtained in the above-mentioned preferred embodiment, the comparative examples 1 and 2 were measured with respect to the distribution of the remaining stress from the surface thereof toward the depth direction. The result of the measurement is shown in FIG. 7. In FIG. 7, the relationship between the remaining stress (MPa) of the coil spring in the present preferred embodiment and the depth from the surface thereof is shown by using Δ and continuous line. The relationships between the remaining stress (MPa) of the coil springs in the comparative examples 1 and 2 and the depth from the surface are shown by using □, ○ and continuous line respectively.

As is clear from FIG. 7, the coil spring which is subjected the high strength two-stage shot peening in the preferred embodiment shows larger amount of remaining stress at the surface compared with that of the coil springs in the comparative examples.

Endurance Limit of the Coil Spring

Three kinds of coil springs which were obtained in the above-mentioned preferred embodiment and the comparative examples 1 and 2 were measured with respect to the endurance limit by using a star fatigue testing machine. In the examination, the coil springs of the preferred embodiment and the comparative example 2 were subjected to the testing having the average stress σm being 687 MPa and the truncation of the testing is conducted when the testing number N reaches to 5×10⁷. The coil spring of the comparative example 1 is subjected to the testing having the average stress σm being 589 MPa and the truncation of the testing is conducted when the testing number N reaches to 5×10⁷. The examination was conducted to investigate the breakage number in terms of each stress amplitude and the endurance limit was measured at the maximum stress amplitude in which eight out of eight coil springs were not broken. The results of this fatigue testing were shown in FIGS. 8 and 9.

The endurance limit τm of the coil spring which was produced by the present preferred embodiment is 687

(average stress)±560 MPa (FIG. 9). The endurance limit τm of the coil spring produced by the comparative example 1 is 589 (average stress)±415 MPa (FIG. 8) and the endurance limit τm of the coil spring produced by the comparative example 2 is 687 (average stress)±505 MPa (FIG. 9).

Thus the endurance limit of the coil spring of the present preferred embodiment is larger than that of the coil spring of the comparative example 2 by +55 MPa (average stress σm=687 MPa).

It is assumed that the big difference between the endurance limit of the coil spring in the comparative example 1 and the endurance limit of the coil spring in the comparative example 2 is due to the fact that there is difference in the alloy steel composition and that the nitriding treatment is conducted or not. It is assumed that the difference of endurance limit between the coil spring of the present preferred embodiment and the coil spring of the comparative example 2 is due to the effect caused by the fact that the the coil spring of the present preferred embodiment is subjected to the high strength two-stage shot peening.

Having now fully described the present invention, it will be apparent to one of ordinary skill in the art that many changes and modifications can be made thereto without departing from the spirit or scope of the present invention as set forth herein including the appended claims.

We claim:

1. A process for producing a coil spring, comprising the steps of:

oil quenching and tempering a wire made by cold drawing, the wire comprising:
   C in an amount of 0.55 to 0.75% by weight;
   Si in an amount of 1.00 to 2.50% by weight;
   at least two primary metals selected from the primary metal group consisting of:
   Mn in an amount of 0.30 to 1.5% by weight;
   Ni in an amount of 1.00 to 4.00% by weight;
   Cr in an amount of 0.50 to 2.50% by weight;
   Mo in an amount of 0.10 to 1.00% by weight;
   at least one secondary metal selected from the secondary metal group consisting of:
   V in an amount of 0.05 to 0.60% by weight;
   Nb in an amount of 0.05 to 0.60% by weight;
   and the balance of substantially Fe;

hot tempering said wire, thereby preparing the tempered wire whose tensile strength falls in the range of from 1370 to 1670N/mm$^2$;

cold coiling; hardening; tempering; grinding; gas nitriding; high strength two-stage shot peening; and low temperature annealing said tempered wire.

2. A process for producing a coil spring according to claim 1, wherein said high strength two-stage shot peening comprises:
   a first shot peening which conducts an impeller projection whose speed falls in the range of from 70 to 100 m/s by using a shot ball whose hardness falls in the range of from Hv650 to 850 and whose φ falls in the range of from 0.6 to 1.0 RCW; and
   a second shot peening which conducts an air projection whose air pressure falls in the range of from 0.3 to 0.7 MPa by using a shot ball whose hardness falls in the range of from Hv700 to 900 and whose φ falls in the range of from 0.15 to 0.3 RCW or SB.

3. A process for producing a coil spring according to claim 1, wherein said gas nitriding is performed at the temperatures of from 420° to 550° C.

* * * * *